(12) United States Patent
Flaugher et al.

(10) Patent No.: US 7,127,908 B2
(45) Date of Patent: Oct. 31, 2006

(54) POLYPROPYLENE OR POLYESTER PLASTIC DESICCANT CARTRIDGE WITH FIBERGLASS FILTER AND BEAD CAGE ENDS

(75) Inventors: David V. Flaugher, Beavercreek, OH (US); Glen D. Perrine, Eaton, OH (US); John M. Evans, Piqua, OH (US)

(73) Assignee: Flow Dry Technology Ltd, Brookville, OH (US)

( * ) Notice: Subject to any disclaimer, the term of this patent is extended or adjusted under 35 U.S.C. 154(b) by 278 days.

(21) Appl. No.: 10/297,102

(22) PCT Filed: Jan. 12, 2001

(86) PCT No.: PCT/US01/01116

§ 371 (c)(1),
(2), (4) Date: Nov. 27, 2002

(87) PCT Pub. No.: WO01/94864

PCT Pub. Date: Dec. 13, 2001

(65) Prior Publication Data

US 2003/0205140 A1 Nov. 6, 2003

Related U.S. Application Data

(60) Provisional application No. 60/209,895, filed on Jun. 7, 2000, provisional application No. 60/209,414, filed on Jun. 5, 2000.

(51) Int. Cl.
F25D 23/00 (2006.01)
(52) U.S. Cl. .............................. 62/271; 62/85; 62/474
(58) Field of Classification Search .................. 62/474, 62/475, 271, 85; 96/135; 165/165
See application file for complete search history.

(56) References Cited

U.S. PATENT DOCUMENTS

| | | | |
|---|---|---|---|
| 3,171,726 A | 3/1965 | Roney et al. | |
| 3,680,707 A * | 8/1972 | Zeek | 210/266 |
| 3,799,352 A | 3/1974 | McClive | |
| 3,841,484 A | 10/1974 | Domnick | |
| 3,879,292 A | 4/1975 | McClive | |
| 4,436,623 A | 3/1984 | Cullen et al. | |
| 4,811,571 A * | 3/1989 | Mayer | 62/474 |
| 5,215,660 A * | 6/1993 | Mosher et al. | 210/283 |
| 5,522,204 A | 6/1996 | Wood | |
| 5,529,203 A | 6/1996 | Flaugher | |
| 5,569,316 A | 10/1996 | Flaugher et al. | |
| 5,580,369 A * | 12/1996 | Belding et al. | 96/125 |

(Continued)

*Primary Examiner*—Melvin Jones
(74) *Attorney, Agent, or Firm*—Wegman Hessler & Vanderburg

(57) ABSTRACT

A desiccant container (2) which comprises a generally cylindrically cross-sectioned cup, two dual-density fiberglass discs (6, 8), desiccant material (4), and a cap (16). The cup includes an outer annular portion, an inner tubular portion, and a bottom which connect together to define a space within. The cap (16) has a planar portion with an aperture for receiving the inner wall portion of the cup and is designed for receipt in the chamber to cover the opening. The cap further includes an outer annular rim portion extending transversely from the planar portion. The peripheral flange portion having tabs with an edge portion which permit the cap to cooperate with the outer wall portion having tabs with an edge portion which permit the cap to cooperate with the outer wall portion so that the cap can be retained within the chamber in one of a number of axially spaced positions to prevent shifting of, and escape of the desiccant.

10 Claims, 5 Drawing Sheets

U.S. PATENT DOCUMENTS

| | | |
|---|---|---|
| 5,580,451 A | 12/1996 | Tack |
| 5,650,563 A | 7/1997 | Cooper et al. |
| 5,716,432 A | 2/1998 | Perrine |
| 5,718,743 A | 2/1998 | Donnelly et al. |
| 5,771,707 A | 6/1998 | Lagace et al. |
| 5,873,298 A * | 2/1999 | Chang .......................... 99/340 |
| 5,878,590 A | 3/1999 | Kadle et al. |
| 5,910,165 A * | 6/1999 | Haramoto et al. ............ 62/474 |
| 5,911,879 A | 6/1999 | Eybergen |
| 6,050,100 A * | 4/2000 | Belding et al. ................ 62/271 |
| 6,106,596 A * | 8/2000 | Haramoto et al. ............ 96/135 |
| 6,217,639 B1 | 4/2001 | Jackson |
| 6,235,192 B1 * | 5/2001 | Melfi et al. .................. 210/136 |
| 6,309,450 B1 | 10/2001 | Millen et al. |
| 6,536,435 B1 * | 3/2003 | Fecteau et al. ......... 128/207.11 |
| 6,616,737 B1 * | 9/2003 | Evans et al. ................... 96/135 |
| 6,692,556 B1 * | 2/2004 | Hayes et al. ................... 96/147 |

\* cited by examiner

POLYPROPYLENE OR POLYESTER PLASTIC DESICCANT CARTRIDGE WITH FIBERGLASS FILTER AND BEAD CAGE ENDS

CROSS-REFERENCE TO RELATED APPLICATIONS

Priority filing benefit of (1) International PCT application PCT/US01/01116 filed Jan. 12, 2001, and published under PCT 21(2) in the English language and (2) U.S. provisional applications Ser. Nos. 60/209,414 filed Jun. 5, 2000 and 60/209,895 filed Jun. 7, 2000.

BACKGROUND OF THE INVENTION

This invention relates to desiccant containers for use in air or fluid dryers of automotive air conditioning systems. More specifically, it relates to desiccant cartridge fiberglass filter and bead cage ends for desiccant retention.

Desiccants are commonly used in automotive air conditioning systems for dehydrating air and refrigerants. Desiccant particles are common in such systems because the high surface area to volume ratios of the particles facilitates their interaction with surrounding air or fluid. Since the desiccant particles must be held in the air or fluid stream and prevented from contaminating other parts of the system, the particles must be held in a container which is permeable to the air or fluid but impermeable to the particles. One form of dryer used in automotive air conditioning systems includes an elongated receiver or accumulator canister having inlet and outlet ports communicating with the interior of the canister. A desiccant container is positioned in the interior of the canister and allows for air and/or fluid through the desiccant material.

One form of package-type desiccant container for use in accumulator or receiver dryers is constructed from synthetic felted wool or polyester which is filled with desiccant and then sealed by stitching or fusing. One drawback to this form of package is that the felted bag may not conform to the shape of the canister so that air or fluid may bypass the desiccant. Another drawback is that the bag may be non-uniform in shape, thereby making automatic assembly of the dryer difficult.

If felted polyester is used as a less expensive substitute for felted wool, the seams of the bag may be formed by ultrasonic welding. Unfortunately, the reliability of such ultrasonic weld is questionable and the bag may open allowing absorbent material to escape from the bag and potentially contaminating the system. In addition, the felted polyester bag is vulnerable to burn-through when the dryer is welded shut.

In another proposed form of an accumulator or receiver dryer, the desiccant particles are trapped between a pair of grids or plates which are welded or pressed inside the canister. According to one embodiment, the desiccant is charged by pouring the desiccant particles into the canister once a first of the grids or plates is positioned. A pipe extends through holes in the grids or plates to exhaust dried air to an outlet port. A dryer of this form is likely to be difficult to assemble because the grids or plates must be slid into position and, in some cases, welded inside the canister. Further, since the desiccant particles are manually poured into the container, the desiccant must be pre-measured due to the difficulty of controlling the amount of desiccant poured into the canister based on visual observation alone. The pouring of the desiccant creates a risk of accidental contamination outside the accumulator since desiccant particles may fall into the pipe communicating with the outlet port. Nevertheless, the amount of desiccant poured into the canister may vary from canister to canister for at least the reasons mentioned above.

U.S. Pat. No. 5,522,204, the contents of which are hereby incorporated by reference, discloses a two-piece desiccant container which can be inserted into an accumulator or receiver dryer. This desiccant container includes a cup for holding particle desiccant, and a cap which is locked to the cup by an integral detent on an inner wall portion of the cup.

U.S. Pat. No. 5,529,203, the contents of which are hereby incorporated by reference, also discloses a two-piece desiccant container which can be inserted within an accumulator or receiver dryer. The desiccant container includes a cup for holding particle desiccant and a cap. The cap is designated for receipt in a chamber to cover the opening. In addition, the cap has a hole for receiving the inner wall portion of the cup. The cup includes a number of nib segments which are arranged into axially spaced nib groupings. The cap includes an edge portion which permits the cap to be retained between axially adjacent nib groups, thus retaining the cap within the cup in one of a number of axially spaced positions. The desiccant particles are either poured directly into the cup or into a felted bag which, in turn, is inserted into the cup before the desiccant container is inserted within the receiver dryer. It is important that desiccant not shift once the cap is locked into place. If there is not enough desiccant to fill the predetermined volume, or if the desiccant should settle over time, then the desiccant within the container will undesirably shift within the chamber.

Accordingly, there is a need in the art to provide a desiccant container which is simple to assemble with means for retaining a cap such that the container can prevent attrition of, and escape of, the desiccant particles while maintaining acceptable fluid flow characteristics and being capable of withstanding the temperature conditions and extreme environment within an automotive air conditioning system.

SUMMARY OF THE INVENTION

It is one object of the present invention to provide an improved desiccant cartridge for a fluid flow chamber such as a refrigerant receiver dryer or accumulator which will withstand the extreme environment, including temperature conditions, in an automotive air conditioning system. It is another object of the present invention to provide an improved desiccant cartridge for a fluid flow chamber which inhibits escape of desiccant material from the cartridge while maintaining acceptable fluid flow characteristics.

The present invention relates to a desiccant cartridge comprising a substantially cylindrical molded plastic cup having opposing first and second outer ends, an outer annular portion, an inner tubular portion having opposing first and second ends and an integral bottom connected to the second ends of the outer annular portion and the inner tubular portion, securing the inner tubular portion within the outer annular portion coaxially disposed to one another, defining a space therebetween. The bottom includes an outer annular rim and an inner rim. The desiccant cartridge further comprising a removable molded plastic cap including an outer annular rim, an inner rim, a center portion and an aperture located within the inner portion for receiving the inner tubular portion of the cup when the cap is received within the space within the cup. The desiccant cartridge further comprising first and second dual density discs. The first and second discs include a high-density layer and a low-density batting bonded together. The first and second discs being inserted into said cup oriented such that said first disc has said batting adjacent said bottom and said second disc has said batting adjacent said cap. The desiccant cartridge further comprising desiccant within the space within the cup between the high-density layer of the first disc and the high-density layer of the second disc;

In the preferred embodiment, the cup and the cap are molded of polypropylene. In a second embodiment, the cap and the cup are molded of polyester. Both polypropylene and polyester provide the desired resistance to the corrosive environment and temperature extremes within automotive air conditioning systems.

The bottom and the cap are provided with a multiplicity of oblong, petal shaped apertures generally disposed with their major axes radially extending from the inner rims toward the outer annular rims. Superposed over the array of petal shaped apertures are a plurality of concentric annular rings.

The cap, with adjustable positioning, combined with the dual-density discs provide secure retention of the desiccant within the cartridge with a spring-like compression.

The various aspects of the present invention will be more fully understood when the following portions of the specification are read in conjunction with the accompanying drawings.

DETAILED DESCRIPTION OF THE PREFERRED EMBODIMENTS

Figure 1:
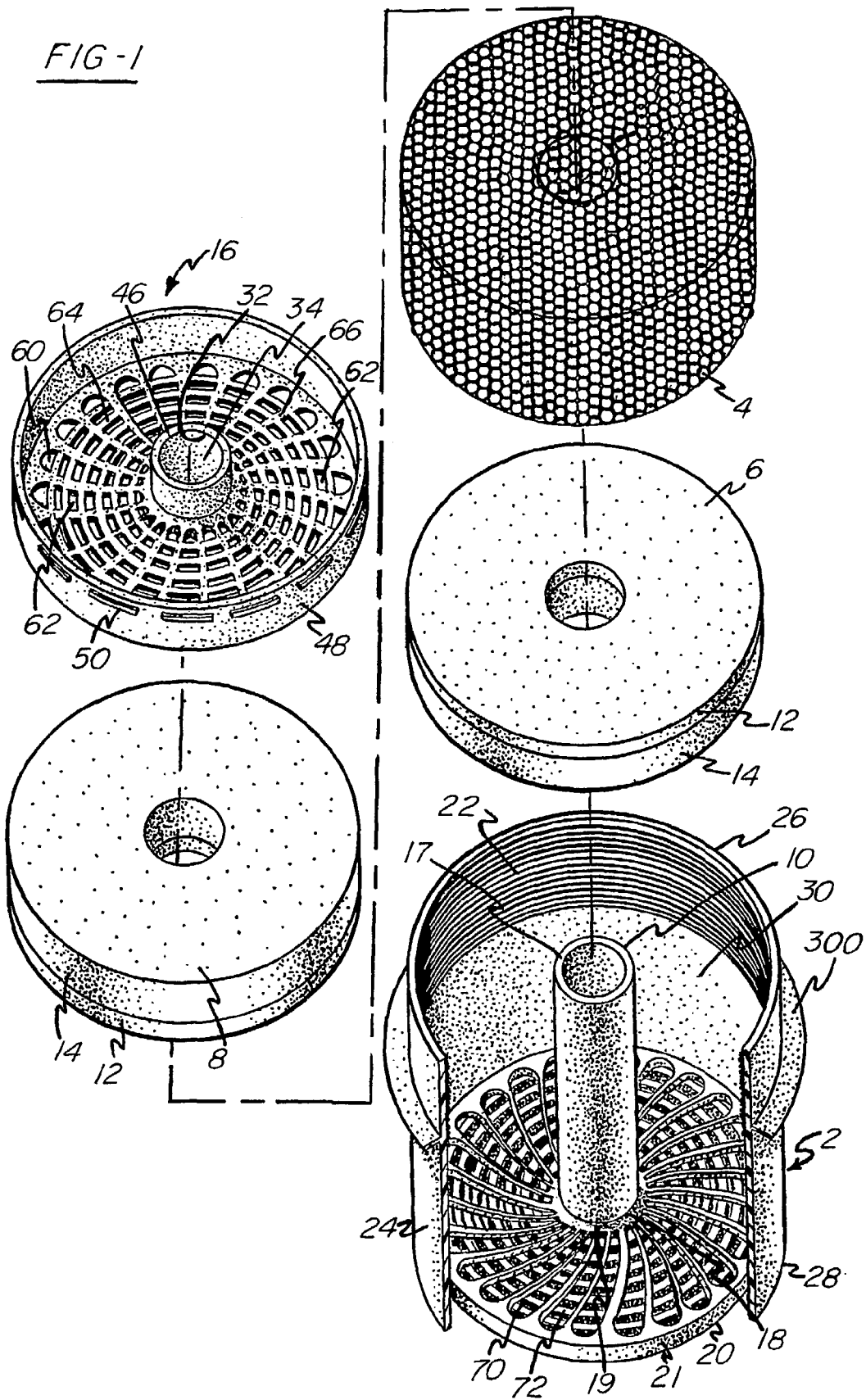
FIG. 1 is an exploded view of the individual components of a first embodiment of the desiccant cartridge and cap of the present invention.

The desiccant cartridge of the present invention, as shown in FIG. 1, includes a substantially cylindrical molded plastic cup 2 having an outer annular portion 24 with opposing first and second ends 26, 28, an inner tubular portion 10 having opposing first and second ends 17, 18, and an integral bottom 20 connected to the second end of said outer annular portion 28 and the inner tubular portion 18 securing the inner tubular portion 10 within the outer annular portion 24 coaxially disposed to one another defining a space 30 therebetween. The bottom 20 including an outer annular rim 21 and an inner rim 19. The desiccant cartridge further comprising a removable plastic cap 16 including an outer annular rim 48, an inner rim 46, a center portion 32 and an aperture 34 located within the center portion 32 for receiving said inner tubular portion 10 of the cup 2 when the cap 16 is received within the space 30 within said cup 2.

The desiccant cartridge further comprising first and second dual density discs 6, 8. The first and second discs 6,8 include a high-density layer 12 and a low-density batting 14 bonded together. The first and second discs 6, 8 being inserted into the cup 2 oriented such that the first disc 6 has the batting 14 adjacent said bottom 20 and the second disc 8 has the batting 14 adjacent the cap 16. The desiccant cartridge further comprising desiccant 4 within the space 30 within the cup 2 between the high-density layer 12 of the first disc 6 and the high-density layer 12 of the second disc 8.

The bottom 20 and the cap 16 of said desiccant cartridge each comprise a multiplicity of oblong petal-shaped apertures 60, 70 extending generally radially from the inner rims 19, 46 to the annular rims 21, 48 and a plurality of solid concentric rings 64, 74 superimposed over the apertures 60, 70. The petal-shaped apertures 60, 70 define a first set of openings. The concentric rings 64, 74 define a second set of openings. The bottom 20 being oriented within the cup 2 such that the first set of openings face inwardly and the second set of openings face outwardly in relation to the space 30 within the cup 2. The cap 16 being oriented within the cup 2 such that the first set of openings face inwardly and the second set of openings 62 face outwardly in relation to the space 30 within said cup 2.

In the embodiment shown in FIGS. 1–6, the bottom 20 and the cap 16 of the desiccant cartridge comprise planar surfaces that face outwardly in relationship to the space 30 within the cup 2.

Turning again to the exploded perspective view shown in FIG. 1, cup 2 is composed preferably of polypropylene, although polyester may also be mentioned as another polymer that may be used. Desiccant material 4 is interposed between dual-density fiberglass laminates 6 and 8, and the inner tubular portion 10 of the cup. The laminates 6, 8 are composed of a high-density layer 12 and low-density fiberglass batting 14 that have been laminated together via hot-bonding, or other bonding techniques. These laminates are available from Johns Manville under the Toughskin designation. The desiccant material 4 comprises beads that are commercially available from universal oil products under the XH7 designation. The high-density layers 12 of the laminates 6, 8 border the desiccant. The cap 16 comprises a plurality of lock tabs 50 of the general type described in U.S. Provisional Patent Application No. 60/158,646 dated Oct. 10, 1999 entitled "Lid Retention Method." Bottom 20 of the cup 2 comprises a multiplicity of openings therein that roughly correspond in shape and size to those provided in the cap.

The cap 16 is snugly and adjustably mounted within the space 30 within the cup 2 of the cartridge. The position of the cap 16 along the axis of the cartridge may be varied. Accordingly, the cap 16 may be snugly secured over a host of different desiccant volumes that may be provided in the cup 2. The interior surface of the cup 2 may be provided with an uneven roughened surface texture 22 as shown by ridges or grooves to increase the friction between the outer periphery of the cap 16 and the cartridge walls. Bumps or other protrusions may be formed along the cartridge walls for this purpose. As best shown in FIG. 1, the outer annular rim 48 of the cap 16 that is adapted to fit snugly within the inner space 30 of the cartridge is provided with a plurality of lock tabs 50 that are spaced from each other around the rim. Each of the lock tabs 50 protrudes radially outward from the rim relative to the radial dimensions of the rim 48. The tabs 50 are composed of a flexible plastic and, in effect, provide a springlike action as they are compressed for sliding, positioning or mounting along the lid of the cartridge, whereby the locking tabs 50 cooperate with the textured inside surface 22 of the cartridge to provide adjustable friction mount of cap 16 within the cartridge.

An annular flange 300 is provided around the circumference of the cup 2 and is composed of a flexible resilient plastic. The flange 300 provides a snug fit within the surrounding fluid flow chamber such as a receiver dryer or accumulator.

Figure 2:
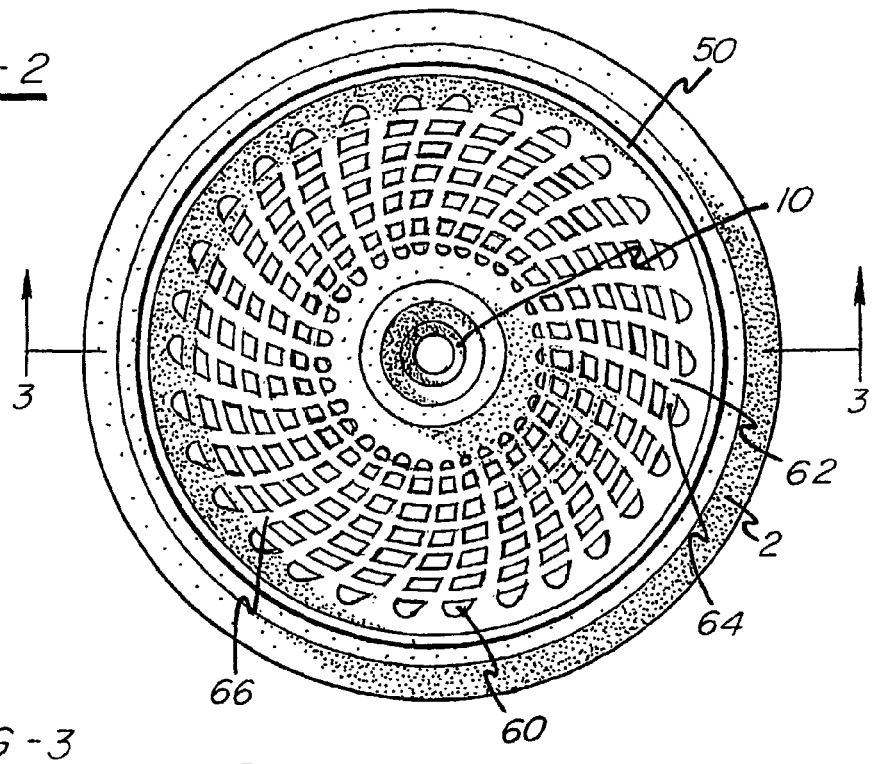
FIG. 2 is a plan view of the outer surface of the cap and cup assembly shown in FIG. 1.
Figure 3:
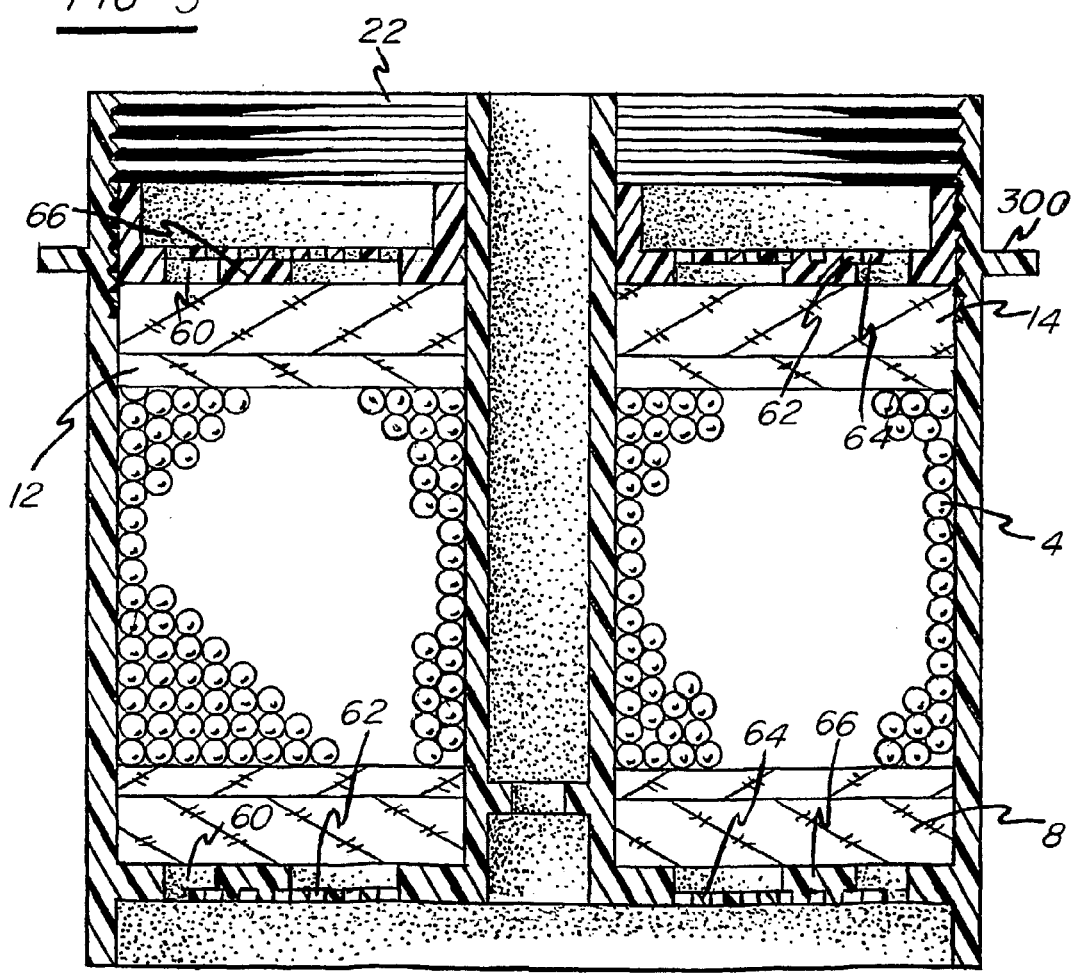
FIG. 3 is a cross-sectional view of the assembly shown in FIG. 2 taken substantially along line 3—3 of FIG. 2.
Figure 4:
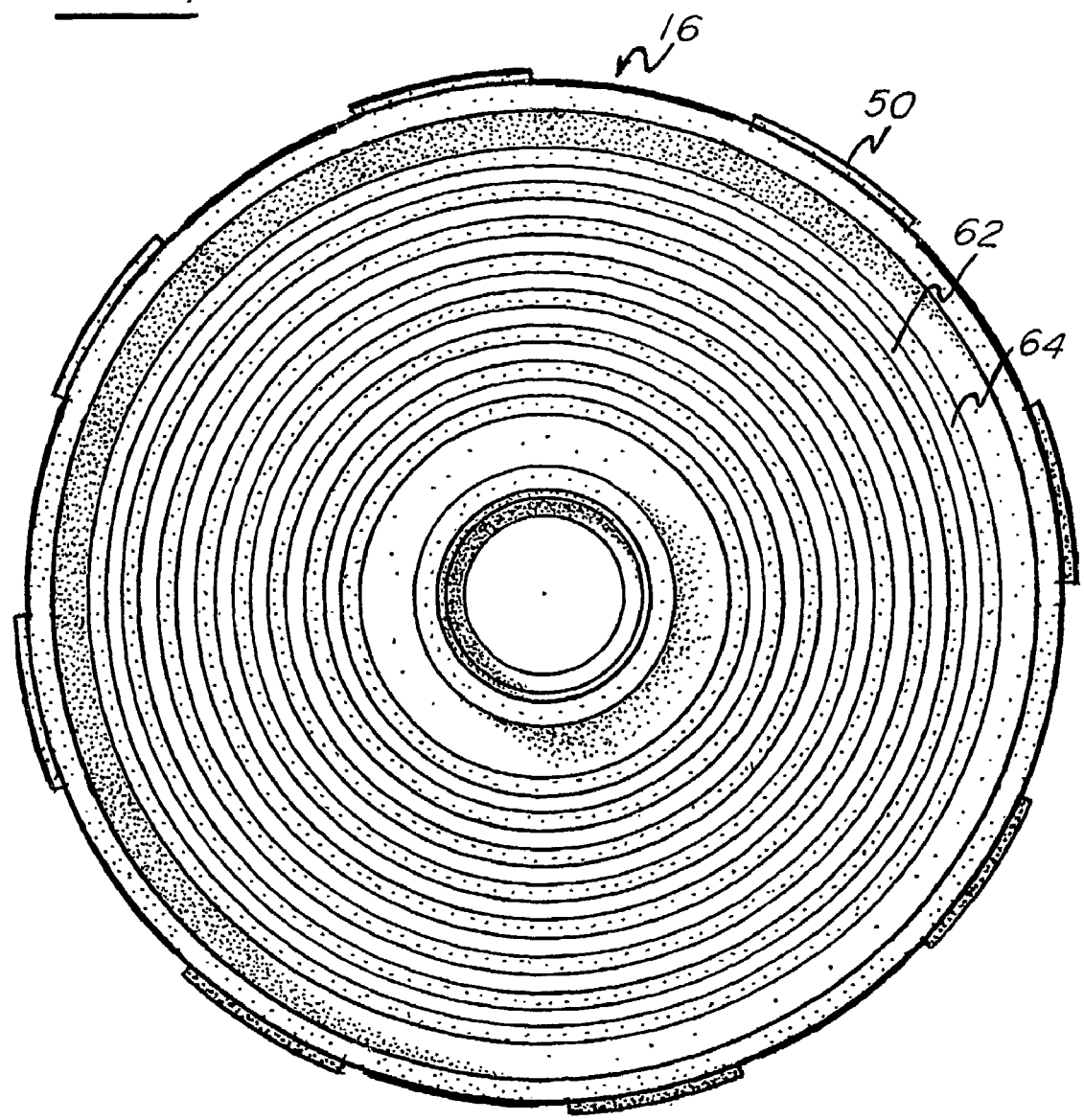
FIG. 4 is a schematic illustration of the outer surface of a cap showing only the topside array of annular openings.
Figure 5:
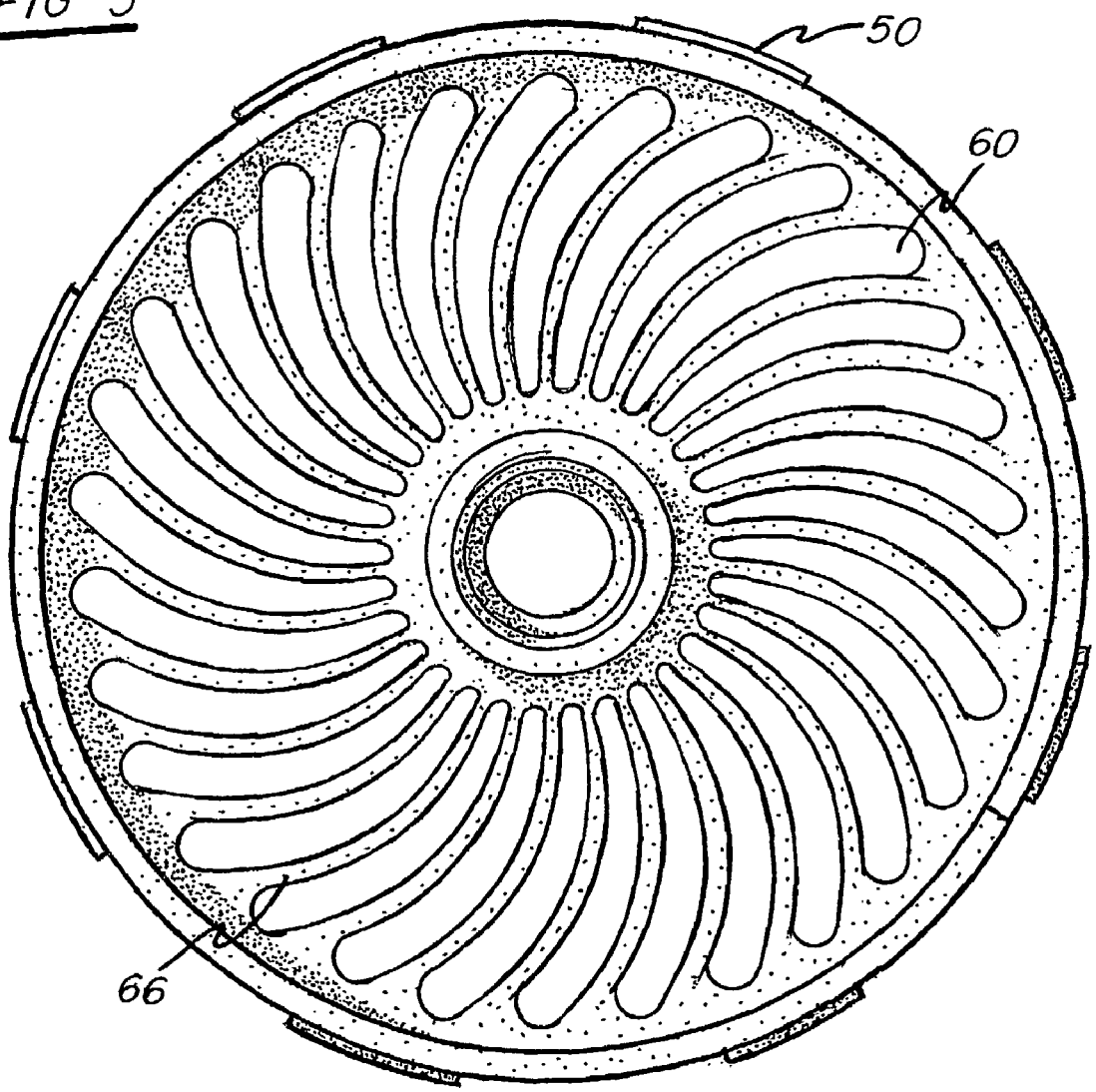
FIG. 5 is a schematic illustration of the inner surface of a cap showing only the bottom side array of petal-shaped apertures that will be placed adjacent the filter medium.

As shown, the cap 16 is provided with a multiplicity of oblong petal-shaped apertures 60 generally disposed with their major axes radially extending from the inner rim 46 toward the outer annular rim 48 of the cap 16. Superposed over the array of the petal-shaped apertures 60 are a plurality of concentric annular openings 62 (FIGS. 1 and 2). The openings 62 are narrower than the width of the minor axes of the openings 60.

Similarly, the bottom 20 of the cup 2 is also provided with this bi-level arrangement of openings wherein the relatively large petal-shaped openings 70 are provided adjacent the fiberglass filter laminate 6 and the annular openings 72 provided under the array of openings 70 on the bottom 20 of the cup 2. Once again, the large surface area provided by the openings 70 will permit the desired volumetric flow of fluid through the cup 2 with the narrower openings 72 serving as a retention cage to minimize desiccant 4 loss through the bottom 20 of the cup 2.

Figure 6:
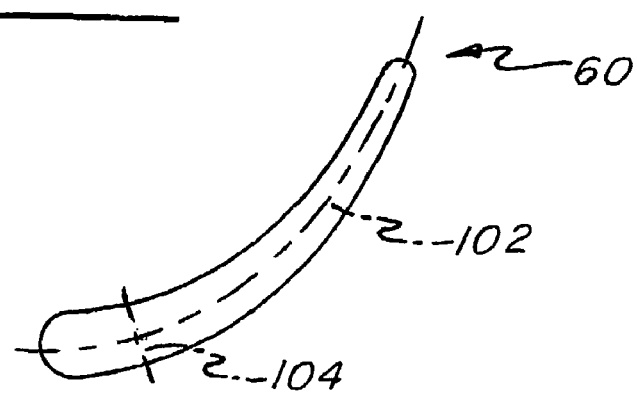
FIG. 6 is a magnified view of one petal-shaped aperture of a bottom or cap for the desiccant cartridge of the present invention.

The petal-shaped apertures 60, 70 are generally oblong and radially disposed about the axis represented by the inner tubular portion 10. The petals each have a major axis 102 extending generally radially, and a minor axis 104 transverse to the major axis 102, as shown in FIG. 6. Individual petals or openings are separated from neighboring openings in the array by generally extending ridge members 66.

Figure 7:
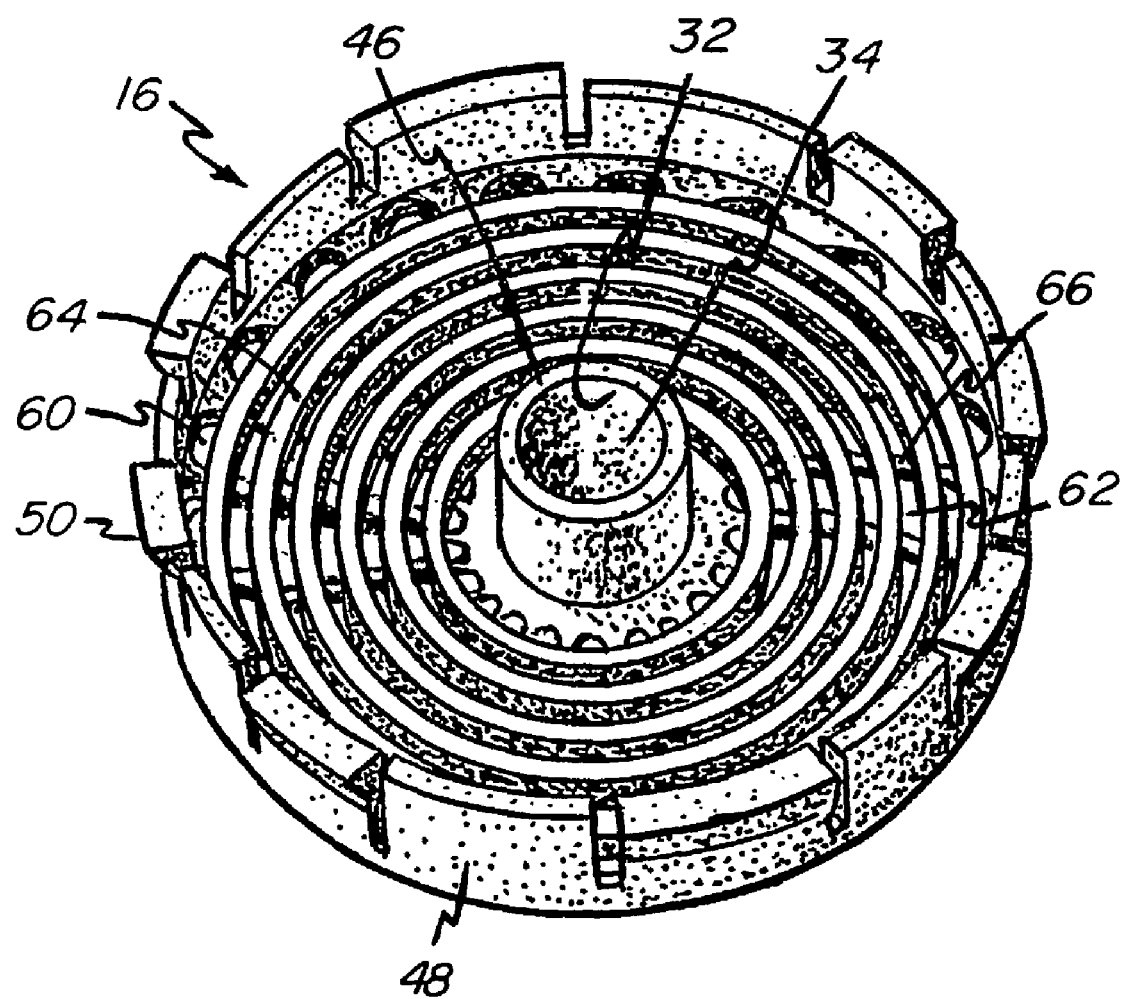
FIG. 7 is a perspective view of a second embodiment of a cap of the present invention.

Turning now to the FIG. 7 embodiment, in contradistinction to the cap shown in FIGS. 1–6, the cap here comprises two distinct levels of aperture depths. The top or outermost level is defined by the openings 62 and the concentric rings or ridges 64 that separate neighboring openings. The second level is defined by the generally oblong apertures 60 and the generally radially extending arcuate ridges 66 separating neighboring openings 60 from each other. The surface area provided by the sum of the areas of the openings 60 is greater than the sum of the areas of the openings 62. This allows for the desired fluid flow volume through the cap 16, while the relatively narrow openings between the ridges 64 still serve to retain desiccant beads in the cup. In the embodiment shown here, the depth (i.e., axial dimension) of the ridge members 66 is greater than the depth (i.e., axial dimension) of the rings 64.

As indicated, the structure shown in FIG. 7 thus provides two levels of aperture depths. The first level is defined by the concentric annular rings. The second level is defined generally by the petal-shaped apertures. The larger surface area of the second level is oriented next to the low density batting of the associated fiberglass disc to provide for acceptable fluid flow characteristics. The first level of aperture depths provides for a smaller surface area, oriented away from the associated fiberglass disc for retaining desiccant particles within the cartridge.

While a preferred embodiment of desiccant 4 has been noted above as being molecular sieve, it will be appreciated that silica gel, or any other suitable type of desiccant, may be used as desired.

While preferred embodiments of the present invention have been disclosed, it will be appreciated that it is not limited thereto, but may be otherwise embodied within the scope of the following claims.

What is claimed is:

1. A desiccant cartridge comprising a substantially cylindrical molded plastic cup having opposing first and second ends, an outer annular portion, an inner tubular portion having opposing first and second ends and an integral bottom connected to said second ends of said outer annular portion and said inner portion securing said inner tubular portion within said outer annular portion coaxially disposed to one another defining a space therebetween; said bottom including an outer annular rim and an inner rim;

said desiccant cartridge further comprising a removable molded plastic cap including an outer annular rim, an inner rim, a center portion and an aperture located within said center portion for receiving said inner tubular portion of said cup when said cap is received within said space within said cup;

said desiccant cartridge further comprising first and second dual density discs;

said first and second discs include a high density layer and a low density batting bonded together;

said first and second discs being inserted into said cup oriented such that said first disc has said batting adjacent said bottom and said second disc has said batting adjacent said cap; and said desiccant cartridge further comprising desiccant within said space within said cup between said high density layer of said first disc and said high density layer of said second disc.

2. A desiccant cartridge as in claim 1 wherein said cup and said cap are molded of polypropylene.

3. A desiccant cartridge as in claim 1 wherein said cup and said cap are molded of polyester.

4. A desiccant cartridge as in claim 1 wherein said bottom and said cap each comprise a multiplicity of oblong petal shaped apertures extending from said inner rim to said annular rim and a plurality of solid concentric rings superimposed over said apertures;

said petal shaped apertures define a first set of openings;

said petal shaped apertures combine with said concentric rings to define a second set of openings;

said bottom being oriented within said cup such that said first set of openings face inwardly and said second set of openings face outwardly in relation to said space within said cup; and said cap being oriented within said cup such that said first set of openings face inwardly and said second set of openings face outwardly in relation to said space within said cup.

5. A desiccant cartridge as in claim 4 wherein said cup and said cap are molded of polypropylene.

6. A desiccant cartridge as in claim 4 wherein said cup and said cap are molded of polyester.

7. A desiccant cartridge as in claim 4 wherein said bottom comprises a planar outermost surface and said cap comprises a planar outermost surface;

said concentric rings are recessed within said oblong shaped petals such that said planar surface of said bottom and said planar surface of said cap comprise apertures defined by said second set of openings said planar surface of said cap and said planar surface of said bottom face outwardly in relation to said space within said cup.

8. A desiccant cartridge as in claim 7 wherein said cup and said cap are molded of polypropylene.

9. A desiccant cartridge as in claim 7 wherein said cup and said cap are molded of polyester.

10. A desiccant cartridge as in claim 1 wherein said first dual density disc and said second dual density disc are comprised of fiberglass.

* * * * *